March 2, 1937.  J. BUGATTI  2,072,615
VALVE
Filed May 23, 1935　　2 Sheets-Sheet 1
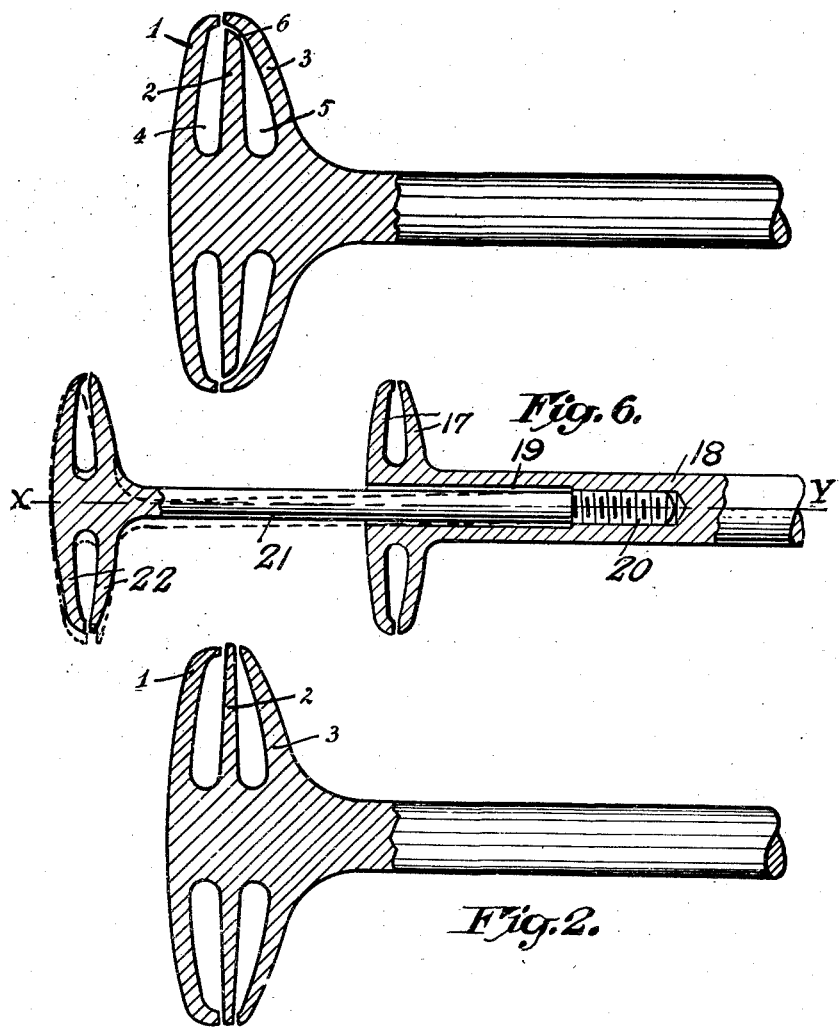

March 2, 1937. J. BUGATTI 2,072,615
VALVE
Filed May 23, 1935 2 Sheets-Sheet 2

Inventor:-
Jean Bugatti
By Mauro & Lewis
Attorneys

Patented Mar. 2, 1937

2,072,615

UNITED STATES PATENT OFFICE 2,072,615

VALVE

Jean Bugatti, Molsheim, France

Application May 23, 1935, Serial No. 23,100
In France May 25, 1934

10 Claims. (Cl. 123—188)

The present invention relates to valves of the mushroom type, and its object is to provide an improved valve of this type.

The essential feature of the present invention consists in giving the valve head a laminated structure, that is to say composed of a plurality of laminas superposed in adjacent relation and which, individually, possess a certain elasticity or a certain freedom of movement while the assembly of the whole possesses the required rigidity.

Owing to the elasticity thus obtained, the valve head is always applied in a fluidtight manner against its seat, even under unfavorable conditions, that is to say, for instance, when this seat is not uniformly worn or is subjected locally to expansions different from the expansions in other points, furthermore, when the valve is utilized in an engine operated through a fluid at a high temperature, for instance an internal combustion engine, the cooling of the valve according to the present invention is considerably improved because it has been found that most of the heat transmitted to the valve head is evacuated through the seat, and in the present case there is an intimate contact between said seat and the valve head over the whole periphery thereof.

Since the valve head is elastic, the sudden shock that occurs when the valve is closed is partly absorbed since the living force of the pieces in movement is partly absorbed for the elastic deformation of said valve head. Therefore the hammering of the seat by the valve is avoided, which is important for the good preservation of these delicate pieces. As the valve closes without any important shock, its working is much less noisy than that of ordinary valves.

The arrangement according to the present invention is particularly well adapted to the case of double head valves, that is to say of valves provided, on a common stem, with two heads or discs located at a certain distance from each other and intended to be applied each against its respective seat. Valves of this type are often employed with high pressure fluids because they can be balanced with reference to the action of the pressure thereon and they are accordingly easier to control. Now, such valves work generally in a medium in which variable, and most often very high, temperatures exist. They may therefore dilate in a non-uniform manner or they may not be applied accurately on the corresponding seats when these various elements expand. Furthermore, as the valve discs and the corresponding seats are machined separately, small differences often exist between the distance between the seats and the distance between the valve discs. Consequently, it is always difficult to ensure and to maintain fluidtightness between valve discs of this kind and their respective seats.

In this case, the present invention consists essentially, in order to obviate the drawbacks inherent in known valves of this kind, in making at least one of the valve discs elastic, as above explained, so that it can compensate for the slight axial difference in the distance between the seats.

In a preferred embodiment of the invention, the valve head is divided, in a direction at right angles to the axis of the valve stem, into a rigid portion and an elastic portion, which, at least in its peripheral zone where it is to bear against the seat, is at a very small distance from this rigid portion, the latter acting as an abutment for said elastic portion.

Another feature of the present invention consists in providing a double valve of the type above referred to arranged to permit a certain relative displacement of the valve heads with respect to each other in a direction at right angles to the axis of the valve stem.

In order to obtain this result, the section of the portion of the stem connecting the two valve heads with each other may be reduced in order to render this portion of the stem elastic. But this feature cannot be employed in many cases. This is due to the fact that the distance between the valve heads is necessarily in relation with their diameters and it is necessary to leave a sufficient cross section of the valve stem for keeping the end valve head in proper axial position.

In a preferred embodiment of the invention, each of the valve heads is provided with a distinct stem and the stem of the end valve head is engaged into the hollow stem of the other valve head and is fixed at the bottom of said hollow stem through any suitable means (by screwing, keying, etc.). With this arrangement, the end valve head can be provided with a sufficiently long and flexible stem. It is preferably made elastic in the manner above stated. Therefore, its deformability compensates for the lack of perpendicularity of its displacements with respect to the axis of the other valve head. Besides this defect is of very little importance due to the great distance of the end valve head to the point where the stem thereof is fixed.

Other features of the present invention will result from the following detailed description of some specific embodiments thereof.

Preferred embodiments of the present invention will be hereinafter described with reference to the accompanying drawings, given merely by way of example, and in which:

Fig. 1 is an elevational view, partly in axial section, of a first embodiment of a valve according to the present invention;

Fig. 2 is a view similar to Fig. 1 and corresponding to another embodiment;

Fig. 6 is a longitudinal sectional view of a valve provided with two valve heads connected together through a flexible stem according to the present invention.

Figure 3:
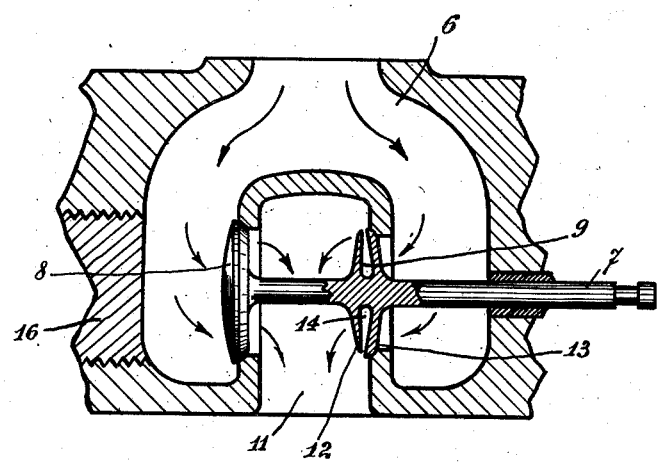
Fig. 3 is an elevational view, partly in section, of a double head valve according to the present invention.

In the embodiments of Figs. 1 and 2, each valve head includes three elastic laminas 1, 2 and 3, obtained for instance by making nicks in the metal at 4 and 5. In the embodiment of Fig. 1, laminas 1 and 3 have been curved toward each other at their periphery so that the valve head has the usual shape. The intermediate lamina 2, which is shorter than the other ones, is provided with a substantially conical surface 6. The intervals between these laminas and the thicknesses thereof are such that, if lamina 3 is deflected at its periphery, it comes to bear against lamina 2 and then the whole is applied, through the peripheral edge of 3 against the third lamina 1. Of course, the valve could be so devised that part 3 first comes into contact with part 1, and then with part 2, or with both simultaneously. In any case, it will be readily understood that the elasticity of the valve head is gradually variable. Of course, it is necessary that the deflection of these three laminas 1, 2, 3, working in parallel should be limited in such manner that the valve head can always perform its function, which is to stop the hole limited by its seat.

In the embodiment shown by Fig. 2, the three laminas are made of substantially the same external diameter, and in this embodiment also the elasticity of the composite valve head is gradually variable as above explained.

Of course it should be well understood that the invention is not in any way limited to the embodiments just above described. It can be applied as well to explosion engines as to combustion engines, to steam engines, to compressors, and so on.

The invention can obviously be applied to the case of a valve the stem of which carries a plurality of valve heads, and in this case all or a part of these valve heads may be made according to the invention as above stated.

Figure 4:
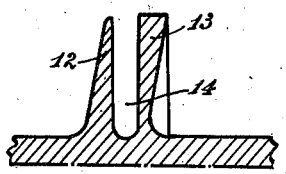
Figs. 4 and 5 are partial sectional views illustrating the method of manufacturing the elastic valve head of Fig. 3, said valve head being shown at two different times of its manufacture.
Figure 5:
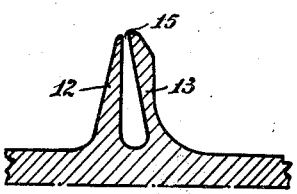

Figs. 3 to 6 relate to the case of double head valves. In the embodiment of Figs. 3 to 5, the valve, which includes a stem 7 and two valve heads 8 and 9, controls the inflow of fluid from a chamber 10 into another chamber 11. The valve element 9 includes a rigid portion 12 and a flexible portion 13. I have shown at 16 a removable plug which permits to examine the valve system and to remove it in case of need.

When machining the element 9 of the valve, I first leave a very thick disc. Then this disc is divided into two portions 12 and 13 by providing an annular groove 14 (Fig. 4) of a suitable thickness and extending radially as far as the diameter of the rod or stem. Finally the elastic portion 13 is bent in the hot state in the direction of the rigid portion, a small play being provided at 15 (Fig. 5) so as to permit the elastic compensation above referred to. Portion 13 has been thinned down in the central portion so as to obtain the required elasticity.

In the embodiment shown by Fig. 6, the stem 18 of the elastic valve head 17 is provided with a cylindrical bore 19 on the bottom of which the stem 21 of the other valve head 22 is fixed, for instance by screwing at 20. A sufficient play is provided between the inner wall of bore 19 and stem 21, in such manner as to permit this last mentioned stem to be deformed, for instance as shown in dotted lines. Such deformations permit the two valve heads 17 and 22 to be applied against their seats in a satisfactory manner even when said valve heads or said seats are not quite exactly parallel. As shown in the drawings, valve head 22 is elastic, which permits a correct application of this valve head against its seat in spite of the lack of perpendicularity of said valve head with respect to axis X—Y when the valve is deformed as shown by the dotted lines.

While I have, in the above description, described what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A valve having a valve head which comprises at least two outwardly extending annular laminas spaced apart from each other and the space between which is wider, in the axial direction, in the portion thereof close to the axis of the valve than in the peripheral portion, the peripheries of the two extreme laminas being bent toward each other, so that the valve head forms a laminated structure of smaller thickness at its periphery than in its central part.

2. A valve having a valve head which comprises a solid central portion provided with a plurality of outwardly extending annular laminas integral with said central portion and separated from one another by an interval the width of which, measured in the direction of the axis of the valve, decreases from the root thereof toward the periphery thereof, the peripheral edges of said annular laminas being disposed in close proximity to one another, said laminas having axial sections which taper from root to periphery, so that their peripheral parts are flexible.

3. A valve according to claim 2 including at least three annular laminas, the intervals between said laminas and their respective thicknesses being such that they are successively deflected against one another so that the flexibility gradually decreases.

4. A valve according to claim 2 including three annular laminas, in which the intermediate lamina is of a diameter smaller than those of the two extreme laminas.

5. A valve according to claim 2 including three annular laminas, in which all of these three laminas are of the same diameter.

6. A valve having a valve head which comprises a solid rigid portion, an outwardly extending disc rigid with said central portion, and a flexible disc also integral with said central portion and the peripheral part of which is at a short distance from the periphery of the rigid disc.

7. A valve including a valve stem and two valve heads carried by said valve stem, at least one of said valve heads including a solid central portion and at least two annular laminas integral with said central portion and separated from each other by an interval the width of which, measured in the direction of the axis of the valve, decreases from the root toward the periphery thereof, the peripheral edges of said annular laminas being disposed in close proximity to each other, and at least one of them being flexible.

8. A valve according to claim 7 in which the portion of the valve stem between the two valve heads is of sufficiently small diameter for being flexible.

9. A valve according to claim 7 in which the valve stem is made of two parts, each integral with one of the valve heads, the first of said parts of the valve stem being provided with a cylindrical bore extending through the valve head corresponding to said part of the valve stem, and the second of said parts of the valve stem being flexible and engaging into said bore to the bottom of which it is fixed, a sufficient annular clearance space being provided between this flexible part of the valve stem and the inner wall of said bore.

10. A valve according to claim 7 in which the valve stem is made of two parts, each integral with one of the valve heads, the first of said parts of the valve stem being provided with a cylindrical bore extending throughout the valve head corresponding to said last mentioned part of the valve stem, and the second of said parts of the valve stem being flexible and engaging into said bore to the bottom of which it is fixed, a sufficient annular clearance space being provided between this flexible part of the valve stem and the inner wall of said bore, each valve head including a solid central portion and at least two annular laminas integral with said central portion and separated from each other by an interval the width of which, measured in the direction of the axis of the valve, decreases from the root toward the periphery thereof, the peripheral edges of said annular laminas being disposed in close proximity to each other, and at least one of them being flexible.

JEAN BUGATTI.